United States Patent [19]

Yang

[11] Patent Number: 5,453,673
[45] Date of Patent: Sep. 26, 1995

[54] DC MOTOR WITH AUXILIARY EXCITING POWER SUPPLY FOR SWITCHING-ON SERIES (OR COMPOUND) START OF SHUNT NORMAL OPERATION ACCORDING TO THE LOAD

[76] Inventor: Tai-Her Yang, 5-1 Taipin St., Si-Hu Town, Dzan-Hwa, Taiwan, Prov. of China

[21] Appl. No.: 67,961

[22] Filed: May 27, 1993

[51] Int. Cl.$^6$ .............................. H02P 7/01; H02P 7/282
[52] U.S. Cl. ..................... 318/530; 318/246; 318/523; 318/526
[58] Field of Search ........................... 318/244, 245, 318/246, 247, 248, 493, 494, 495, 497, 498, 500, 521, 523, 526, 527, 528, 529, 530, 532, 536, 537

[56] References Cited

U.S. PATENT DOCUMENTS

| | | |
|---|---|---|
| 896,216 | 8/1908 | Krieger . |
| 964,659 | 7/1910 | Lamme . |
| 1,192,649 | 7/1916 | Latour . |
| 2,661,452 | 12/1953 | Curry et al. . |
| 3,331,004 | 7/1967 | Brown . |
| 3,360,705 | 12/1967 | Morris . |
| 4,008,423 | 2/1977 | Christianson et al. . |

*Primary Examiner*—Bentsu Ro
*Attorney, Agent, or Firm*—Bacon & Thomas

[57] ABSTRACT

A motor control circuit includes a series motor made up of a series field winding serially connected with an armature or a compound motor having both a series field winding and a shunt field winding. The series field winding is parallel connected to an auxiliary power supply and connected to the main motor driving power source via a switch which connects the series winding in series therewith during start-up or an overload condition and in parallel therewith during normal operation.

5 Claims, 1 Drawing Sheet

DC MOTOR WITH AUXILIARY EXCITING POWER SUPPLY FOR SWITCHING-ON SERIES (OR COMPOUND) START OF SHUNT NORMAL OPERATION ACCORDING TO THE LOAD

SUMMARY OF THE INVENTION

The present invention relates to a DC motor with an auxiliary excitation power supply for a series or compound motor and which is switched on to excite the series field winding during normal operation and provide the motor with characteristics of high-efficiency and low-loss shunt operation, and series or compound start or overload operation.

DETAILED DESCRIPTION OF THE INVENTION

The conventional series or compound motor often has excellent current-to-torque characteristics during start-up and overload operation. However, it is relatively poor in efficiency during normal operation as a result of the series field voltage drop. A shunt motor, on the contrary, has excellent efficiency during normal operation but the current is too high during start-up and overload. The present invention relates to a DC motor with an auxiliary excitation power supply for a series or compound motor and which is switched on to excite the series field winding during normal operation and provide the motor with characteristics of high-efficiency and low-loss shunt operation, and series or compound start or overload operation.

Figure 1:
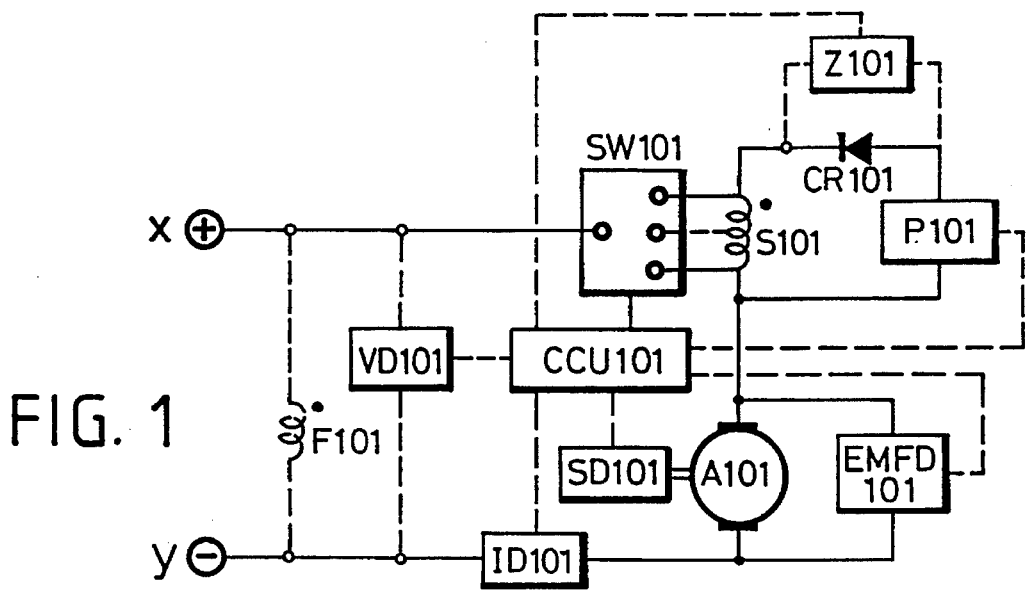
FIG. 1 is a schematic diagram showing the principal elements of a circuit according to a first preferred embodiment of the invention.

Referring to FIG. 1, the preferred motor control circuit includes a series motor made up of a field winding S101 serially connected with armature A101 or a compound motor having both series field winding S101 and a shunt field winding F101. An auxiliary exciting power supply P101, which may be a commutated power supply from a battery, a generator, or an AC power supply, is connected in series with positively connected choking diode CR101 and then parallel connected to each end of series field winding S101 to provide an auxiliary excitation voltage having the same polarity as the original driving voltage. If auxiliary exciting power supply P101 is a storage type power source, then a feedback charge limiter Z101 made up of a resistance or solid-state linear type switch device can be parallel connected to each end of choking diode CR101.

A relay, which may be manually operated, operated by the eccentric force of the motor, or driven by current, or an electro-mechanical of solid-state switch device SW101 operated by controller CCU101, is provided to switch off the auxiliary power supply for series or compound starting the motor, and is switched on upon completion of starting so that auxiliary power supply P101 may excite the series field winding S101 and cause the motor to appear as a shunt motor. The switch may also be connected to an intermediate tap position of series field winding S101 to obtain intermediate characteristics.

The circuit itself may further include a motor speed detector SD101 or armature current detector ID101 to feed back the motor speed current, armature EMF in the form of an analog or digital signal to controller CCU101 for operating the switch device SW101 to control the motor for series (or compound) starting, and further to cause the motor to behave as a shunt motor by virtue of auxiliary exciting power supply P101 exciting the series winding during normal operation.

Controller CCU101 can be controlled via a manual input controlled via an electrical interface to provide a series (compound) start effect, to switch to an overload state, or to provide shunt normal operation. For example, it may be arranged to accept one of the several illustrated motors operating feedback signals or respective feedback inputs, including motor load current, rotational speed, armature EMF value, or auxiliary exciting current value.

The above-described system, illustrated in the context of a fixed armature voltage system, can further be applied to a compound voltage driven armature system. In that case, a detector VD101 may be parallel connected to armature A101 for detecting power voltage, in addition to the speed detector SD101 for detecting motor running speed, load current detector ID101 for detecting armature current value, or EMF detector EMF101 for detecting the EMF value, the voltage being transmitted to CCU101 and reference to the change in voltage of the power input to correct the switching speed value.

Figure 2:
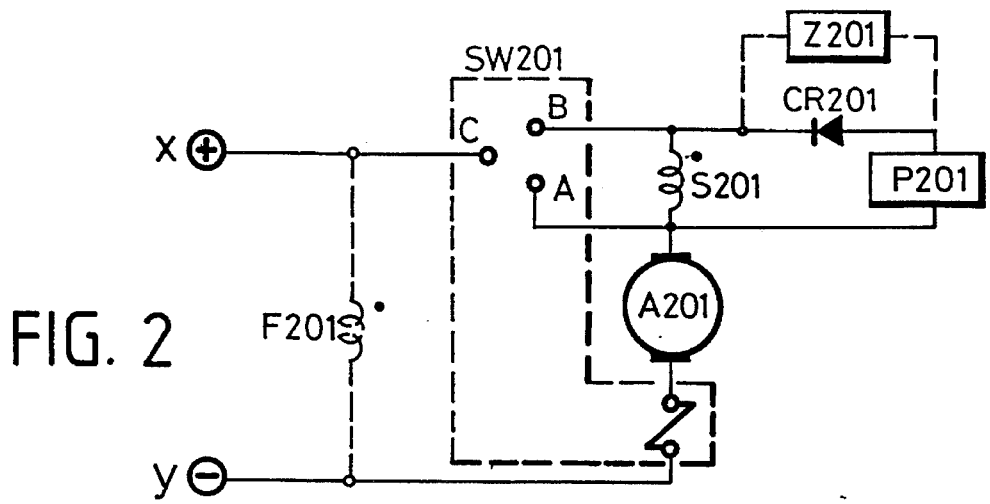
FIG. 2 is a schematic diagram showing a second preferred embodiment of the invention.

FIG. 2 shows a second embodiment of the invention, including a series field winding S201 and armature A201, with one end of the armature being connected to power supply Y while the connection ends of series field winding S201 and armature A201 are connected to contact A of contact type switch device SW201, with contact A being disconnected from contact C during start-up. The other end of series field winding S201 is connected to contact B of switch device SW201 such that contact B is connected to contact C during start-up.

The common contact C of switch device SW201 is connected to power supply x. The switch device can be manually controlled, driven by an eccentric force of the motor, or by a current active type relay in series with the armature, an armature EMF drive type relay, or by the auxiliary excitation value of the auxiliary excitation power supply. During starting or overload, contact C and contact B are connected together, and during normal operation contact C and contact A are connected together.

The circuit of FIG. 2 may further include a shunt field winding F201 parallel connected between power supply x and y to cause the motor to appears in a shunt state during normal operation by virtue of switching through contact type switch device SW201, and to appear as a compound motor during starting and overloading.

An auxiliary exciting power supply P201, which may be a commutated power supply from a battery, or a generator or AC power supply, is connected in series with positively connected choking diode CR201 and then parallel connected to each end of series field winding S201 to provide an auxiliary excitation voltage having the same polarity as the principal driving voltage. If auxiliary excitation power supply P201 is a storage type power source, then a feedback charge limit regulator Z201 made up of a resistance or solid-state linear type switch device can be parallel connected to each end of choking diode CR201 in order to regulate the charge against the storage element when the voltage drop across the series field winding is higher than the auxiliary excitation power supply.

Figure 3:
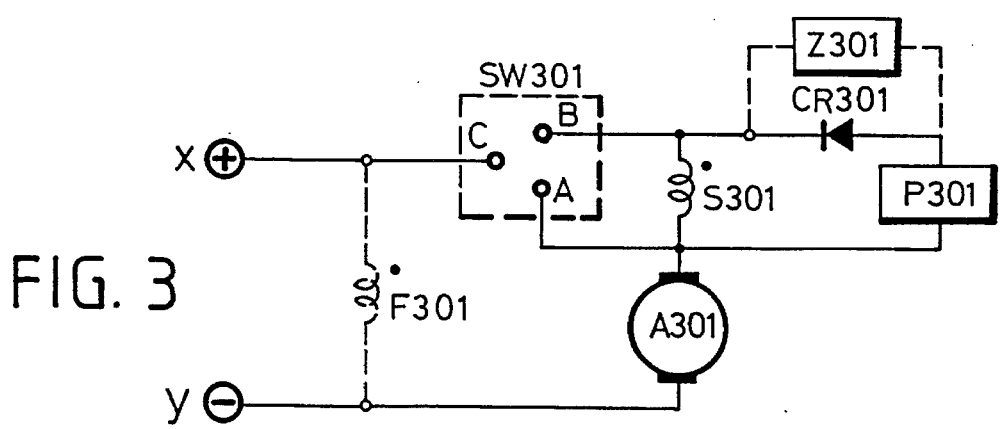
FIG. 3 is a schematic diagram showing a third preferred embodiment of the invention.

FIG. 3 shows another embodiment of the invention including a series field winding S301 and armature A301, with one end of the armature A301 being connected to power supply y while the connection ends of series field winding S301 and armature A301 are connected to contact A of switch device SW301 to cause current to be supplied during normal operation leading from contact A to armature A301. The other end of series field winding S301 is connected to contact B of switch device S301.

The common contact C of switch device SW301 is connected to power supply x. The switch device can be manually controlled, driven by an eccentric force of the motor, or by a current active type relay in series with the armature, an armature EMF driven relay, or the auxiliary exciting value of the auxiliary power supply. During starting or overloading, contact C and contact B are mutually connected, and during normal operation, contact C and contact A are mutually connected.

In addition, a shunt field winding F301 may be mounted between the power supply positive end x and ground wire y such that during normal operation the motor will appear to be in a shunt state as auxiliary exciting power supply P301 excites series winding S301 by virtue of switching through switch device SW301, and appears as compound wiring connection during starting and overload.

An auxiliary exciting power supply P301, which may be a commutated power supply from a battery, or a generator or AC power supply, is connected in series with positively connected choking diode CR301 and then parallel connected to each end of series field winding S301 to provide an auxiliary excitation voltage having the same polarity as the principal driving voltage. If auxiliary excitation power supply P301 is a storage type power source, then a feedback charge limit regulator Z301 made up of a resistance or solid-state linear type switch device can be parallel connected to each end of choking diode CR301.

I claim:

1. A DC motor comprising:

a main motor driving power source having first and second terminals;

an auxiliary power supply having first and second terminals;

a series winding having first and second ends;

an armature having first and second ends;

wherein the first end of the armature is connected to the first terminal of the main motor driving power source and the second end of the armature is connected to the first end of the series winding;

wherein the first and second terminals of the auxiliary power supply are respectively connected to the first and second ends of the series winding;

wherein the series winding is connected to the main motor driving power source via a switch having a first terminal connected to the first end of the series winding, a second terminal connected to the second end of the series winding, and a third terminal connected to the second terminal of the main motor driving power source, such that the first terminal of the switch is connected to the third terminal of the switch during normal motor operation to thereby connect the second terminal of the main motor driving power source directly to the armature, and such that the second terminal of the switch is connected to the third terminal of the switch during start-up or an overload condition of the motor to thereby connect the series winding in series between the armature and the second terminal of the main motor driving power source.

2. A DC motor as claimed in claim 1, wherein the series winding further comprises an intermediate tap connected to said switch.

3. A DC motor as claimed in claim 1, wherein said switch is an inertial switch responsive to rotation of the motor.

4. A DC motor as claimed in claim 1, further comprising a choking diode connected in series between the auxiliary power supply and the series winding.

5. A DC motor as claimed in claim 4, wherein the auxiliary power supply is a storage type power source and further comprising a feedback charge limiter connected in parallel with the choking diode.

* * * * *